(12) United States Patent
Kilgore et al.

(10) Patent No.: US 8,590,223 B2
(45) Date of Patent: Nov. 26, 2013

(54) SOLAR PANEL ASSEMBLY ATTACHMENT APPARATUS

(75) Inventors: Dorian J. Kilgore, Southfield, MI (US);
William Teller, Lake Orion, MI (US);
Elio G. Evangelista, Chesterfield, MI (US); Justin McCullah, Brunswick, OH (US); Thomas Wagner, Parma, OH (US); Luc DuPont, Berkeley, CA (US);
James VanBoxel, Strongsville, OH (US)

(73) Assignee: A. Raymond et Cie, Grenoble (FR)

( * ) Notice: Subject to any disclaimer, the term of this patent is extended or adjusted under 35 U.S.C. 154(b) by 9 days.

(21) Appl. No.: 13/220,077

(22) Filed: Aug. 29, 2011

(65) Prior Publication Data

US 2013/0048056 A1 Feb. 28, 2013

(51) Int. Cl.
*E04D 13/18* (2006.01)

(52) U.S. Cl.
USPC ........... 52/173.3; 136/244; 136/251; 439/927

(58) Field of Classification Search
USPC .................. 52/173.3; 136/244, 251; 439/927
See application file for complete search history.

(56) References Cited

U.S. PATENT DOCUMENTS

| | | | |
|---|---|---|---|
| 3,122,604 A * | 2/1964 | Cook et al. | 174/51 |
| 3,528,050 A * | 9/1970 | Hindenburg | 439/92 |
| 3,757,268 A | 9/1973 | Genovese et al. | |
| 3,998,018 A | 12/1976 | Hodges | |
| 4,029,384 A * | 6/1977 | Reinwall, Jr. | 439/397 |
| 4,106,251 A | 8/1978 | Nelsson | |
| 4,113,982 A | 9/1978 | Glaesel | |
| 4,189,881 A | 2/1980 | Hawley | |
| 4,195,895 A | 4/1980 | Ziegler | |
| 4,215,677 A | 8/1980 | Erickson | |
| 4,256,359 A | 3/1981 | Storck | |
| 4,406,505 A | 9/1983 | Avramovich | |
| 4,669,808 A * | 6/1987 | Owen | 439/858 |
| 4,833,848 A | 5/1989 | Guerin et al. | |
| 4,875,876 A | 10/1989 | O'Loughlin | |
| 4,993,959 A * | 2/1991 | Randolph | 439/92 |

(Continued)

FOREIGN PATENT DOCUMENTS

| | | |
|---|---|---|
| DE | 102010022556 B3 | 6/2011 |
| EP | 0671581 A2 | 9/1995 |

(Continued)

OTHER PUBLICATIONS

A Raymond drawing entitled "Solar clip Specific part"; Part No. 214803-1-00, for non-grounding clip shown in Solardis brochure; 1 page (believed to have been offered for sale in U.S. or published on or before Jul. 7, 2010).

(Continued)

*Primary Examiner* — Brian Glessner
*Assistant Examiner* — James Buckle, Jr.
(74) *Attorney, Agent, or Firm* — Harness, Dickey & Pierce, P.L.C.

(57) ABSTRACT

A solar panel assembly attachment apparatus is provided. In another aspect, a single piece and entirely metallic grounding clip is employed. A further aspect includes a clip or fastener which provides both frame grounding and a frame-to-strut attachment. In still another aspect, a grounding clip having barbs is linearly slid onto a solar panel frame and the clip additionally includes one or more flexible wings which are removably snap-fit into a slot of an elongated and rigid strut.

26 Claims, 6 Drawing Sheets

(56) References Cited

U.S. PATENT DOCUMENTS

| | | | |
|---|---|---|---|
| 5,092,939 A | 3/1992 | Nath et al. | |
| 5,108,055 A * | 4/1992 | Kreinberg et al. | 248/71 |
| 5,164,545 A * | 11/1992 | Kreinberg et al. | 174/94 R |
| 5,232,518 A | 8/1993 | Nath et al. | |
| 5,409,549 A | 4/1995 | Mori | |
| 5,419,606 A | 5/1995 | Hull et al. | |
| 5,451,167 A * | 9/1995 | Zielinski et al. | 439/92 |
| 5,571,338 A | 11/1996 | Kadonome et al. | |
| 5,762,720 A | 6/1998 | Hanoka et al. | |
| 6,105,317 A | 8/2000 | Tomiuchi et al. | |
| 6,106,310 A * | 8/2000 | Davis et al. | 439/95 |
| 6,111,189 A | 8/2000 | Garvison et al. | |
| 6,186,698 B1 | 2/2001 | Knapp | |
| 6,269,596 B1 | 8/2001 | Ohtsuka et al. | |
| 6,276,947 B1 * | 8/2001 | Homfeldt et al. | 439/92 |
| 6,370,828 B1 | 4/2002 | Genschorek | |
| 6,405,494 B1 | 6/2002 | Wismeth | |
| 6,672,018 B2 | 1/2004 | Shingleton | |
| 6,784,360 B2 | 8/2004 | Nakajima et al. | |
| 6,959,517 B2 | 11/2005 | Poddany et al. | |
| 7,150,661 B2 * | 12/2006 | Cisey | 439/857 |
| 7,195,513 B1 | 3/2007 | Gherardini et al. | |
| 7,217,058 B2 | 5/2007 | Herb | |
| 7,260,918 B2 | 8/2007 | Liebendorfer | |
| 7,297,866 B2 | 11/2007 | Aschenbrenner | |
| 7,435,134 B2 | 10/2008 | Lenox | |
| 7,592,537 B1 | 9/2009 | West | |
| 7,600,349 B2 | 10/2009 | Liebendorfer | |
| 7,621,487 B2 | 11/2009 | Brown et al. | |
| 7,634,875 B2 | 12/2009 | Genschorek | |
| 7,686,625 B1 * | 3/2010 | Dyer et al. | 439/92 |
| 7,731,544 B2 * | 6/2010 | Ma et al. | 439/698 |
| 7,745,722 B2 | 6/2010 | Warfield et al. | |
| 7,748,175 B2 | 7/2010 | Liebendorfer | |
| 7,758,011 B2 | 7/2010 | Haddock | |
| 7,766,292 B2 | 8/2010 | Liebendorfer | |
| 7,780,472 B2 | 8/2010 | Lenox | |
| 7,797,883 B2 | 9/2010 | Tarbell et al. | |
| 7,866,099 B2 | 1/2011 | Komamine et al. | |
| 7,921,607 B2 | 4/2011 | Thompson et al. | |
| 7,971,398 B2 | 7/2011 | Tweedie | |
| 7,987,641 B2 | 8/2011 | Cinnamon | |
| 8,025,508 B2 | 9/2011 | Parker et al. | |
| 8,109,048 B2 | 2/2012 | West et al. | |
| 8,256,169 B2 | 9/2012 | Cusson et al. | |
| 2003/0101662 A1 | 6/2003 | Ullman | |
| 2003/0177706 A1 | 9/2003 | Ullman | |
| 2006/0156648 A1 | 7/2006 | Thompson et al. | |
| 2008/0035140 A1 | 2/2008 | Placer et al. | |
| 2008/0053517 A1 | 3/2008 | Plaisted et al. | |
| 2008/0245404 A1 | 10/2008 | DeLiddo | |
| 2009/0019796 A1 * | 1/2009 | Liebendorfer | 52/173.3 |
| 2009/0242014 A1 | 10/2009 | Leary | |
| 2010/0180933 A1 | 7/2010 | Aftanas et al. | |
| 2010/0192505 A1 | 8/2010 | Schaefer et al. | |
| 2010/0236162 A1 | 9/2010 | Tweedie | |
| 2010/0236542 A1 | 9/2010 | Pierson et al. | |
| 2010/0263297 A1 | 10/2010 | Liebendorfer | |
| 2010/0276558 A1 | 11/2010 | Faust et al. | |
| 2011/0036028 A1 | 2/2011 | Beck | |
| 2011/0039430 A1 | 2/2011 | Aftanas | |
| 2011/0100433 A1 | 5/2011 | Jonczyk | |
| 2011/0138585 A1 | 6/2011 | Kmita et al. | |
| 2011/0147553 A1 | 6/2011 | Ostermeier et al. | |
| 2011/0179606 A1 | 7/2011 | Magno, Jr. et al. | |
| 2011/0203637 A1 | 8/2011 | Patton et al. | |
| 2011/0214366 A1 | 9/2011 | Haddock et al. | |
| 2011/0232212 A1 | 9/2011 | Pierson et al. | |
| 2011/0284058 A1 | 11/2011 | Cinnamon | |

FOREIGN PATENT DOCUMENTS

| | | |
|---|---|---|
| FR | 2163787 A5 | 7/1973 |
| FR | 2209024 A1 | 6/1974 |
| GB | 423385 A | 1/1935 |
| GB | 1218275 A | 1/1971 |
| GB | 1510258 A | 5/1978 |
| JP | 7243428 A | 9/1995 |
| JP | 10266499 A | 10/1998 |
| JP | 10339008 A | 12/1998 |
| NL | 8304155 A | 7/1985 |
| WO | WO-8301476 A1 | 4/1983 |
| WO | WO-9816699 A1 | 4/1998 |
| WO | WO-2010149278 A1 | 12/2010 |

OTHER PUBLICATIONS altEstore; Internet Advertisement Publication; "Groundings Lugs With Set Screw"; www.altestore.com; Aug. 25, 2011.

Rayvolt; Internet Advertisement Publication; "Panel fasteners"; Raygroup; May 2011.

Solardis; Brochure; "soprasolar fix"; www.soprasolar.com; Jul. 7, 2010; pp. 1-10.

* cited by examiner

SOLAR PANEL ASSEMBLY ATTACHMENT APPARATUS

BACKGROUND AND SUMMARY

The present invention relates generally to a solar panel assembly attachment apparatus and more particularly to a grounding clip which attaches a solar panel frame to a strut.

Traditionally, peripheral mounting frames holding solar or photovoltaic panels are mounted to a supporting structure on a building roof or on the land through use of threaded fasteners and multi-piece brackets. Exemplary traditional devices are disclosed in U.S. Pat. No. 7,758,011 entitled "Adjustable Mounting Assembly for Standing Seam Panels" which issued to Haddock on Jul. 20, 2010, and U.S. Pat. No. 6,105,317 entitled "Mounting System for Installing an Array of Solar Battery Modules of a Panel-Like Configuration on a Roof" which issued to Tomiuchi et al. on Aug. 22, 2000. These patents are incorporated by reference herein. These devices, however, solely provide frame retention, and are time consuming and complex to install on a job site, such as on top of a windy roof, which thereby incurs significant labor expense and effort.

Another solar panel module fastener is disclosed in German Patent Publication No. 10 2010 022 556 invented by Klaus Hullmann et al. While this fastener is a noteworthy advance in the industry, further improvements are desirable.

Finally, various conventional devices have been used to provide electrical grounding to solar panel assemblies. For example, a grounding lug is attached to a solar panel frame by screws and a wire that extends through a cradle of the lug is retained therein by one or more set screws. An example of this is disclosed in FIG. 1 and the background section of U.S. Pat. No. 7,195,513 entitled "Self-Locking Wire Termination Clip" which issued to Gherardini et al. on Mar. 27, 2007, and is incorporated by reference herein. This patent highlights many of the disadvantages of this lug and threaded fastener approach. Furthermore, this conventional lug and threaded fastener device is time consuming and difficult to install on site and is not easily suited for pre-assembly.

In accordance with the present invention, a solar panel assembly attachment apparatus is provided. In another aspect, a single piece and entirely metallic grounding clip is employed. A further aspect includes a clip or fastener which provides both frame grounding and a frame-to-strut attachment. In still another aspect, a grounding clip having barbs is linearly slid onto a solar panel frame and the clip additionally includes one or more flexible wings which are removably snap-fit into a slot of an elongated and rigid strut. In yet another aspect, two spaced apart and generally C-shaped clamps are coupled to a central mounting section including flexible wings. A method of grounding and attaching a solar panel frame is also disclosed.

The present invention is advantageous over traditional devices. For example, the clip of the present apparatus is inexpensive to manufacture and install. Furthermore, the present grounding clip is suitable for pre-assembly to the frame offsite or at a manufacturing plant, thereby improving quality and reducing assembly cost. Moreover, the present grounding clip allows for simple linear frame attachment and simple linear strut attachment free of extraneous loose parts such as threaded fasteners, nuts and brackets. The multiple clamp and barb configurations of the present apparatus also advantageously increase the electrical grounding continuity and reliability to the solar panel frame as compared to conventional devices. Additional advantages and features of the present invention will become apparent from the following description and appended claims.

DETAILED DESCRIPTION

Figure 1:
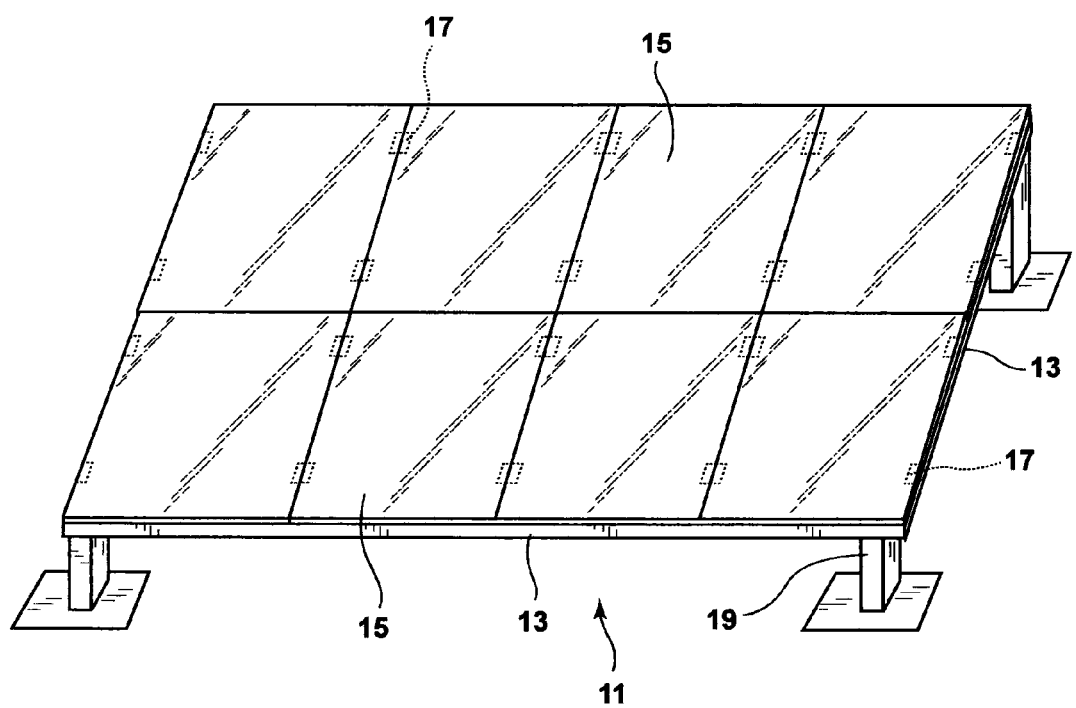
FIG. 1 is a perspective view showing the present solar panel assembly attachment apparatus in a fully installed condition.
Figure 2:
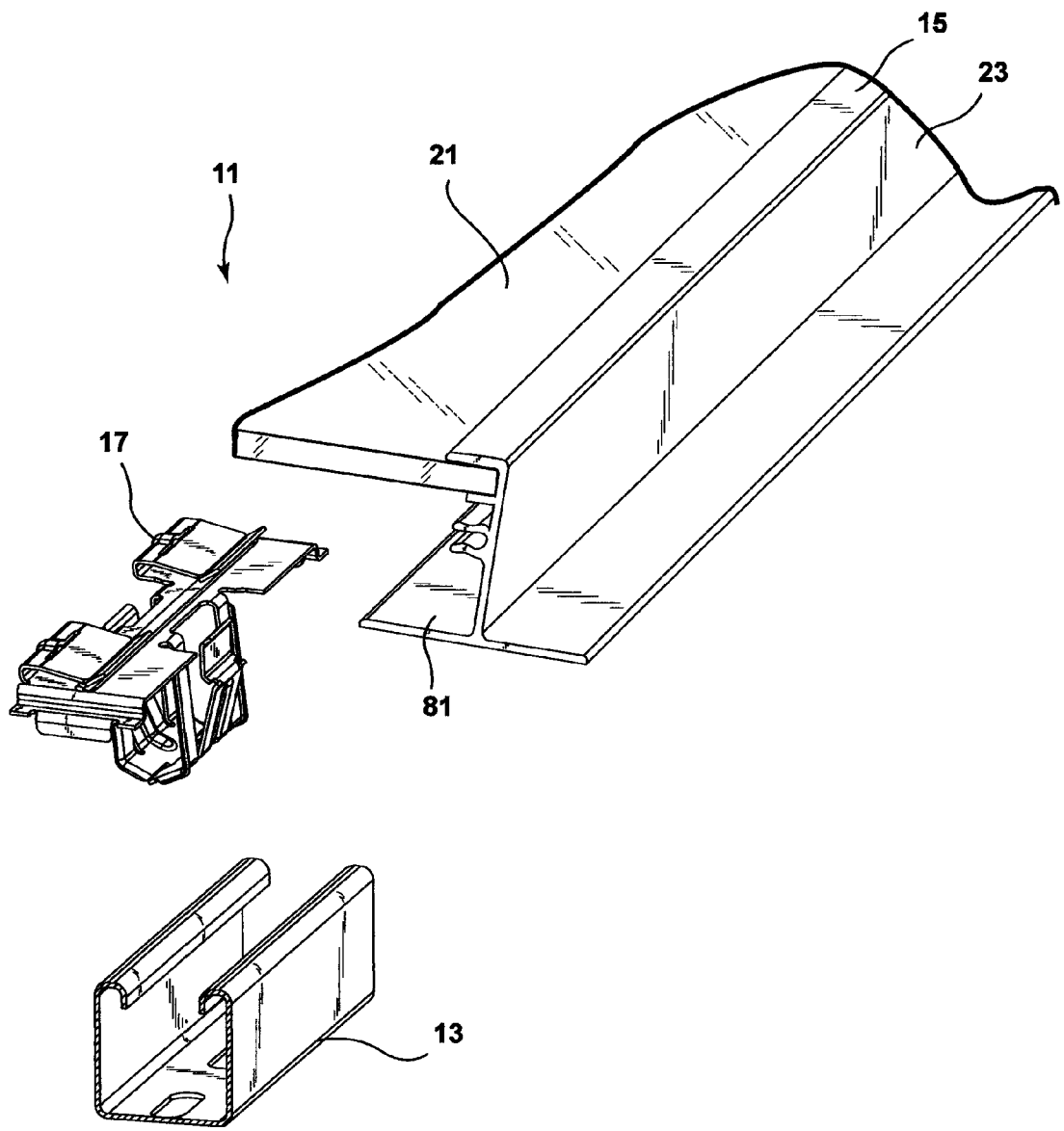
FIG. 2 is an exploded perspective view showing the apparatus.
Figure 3:
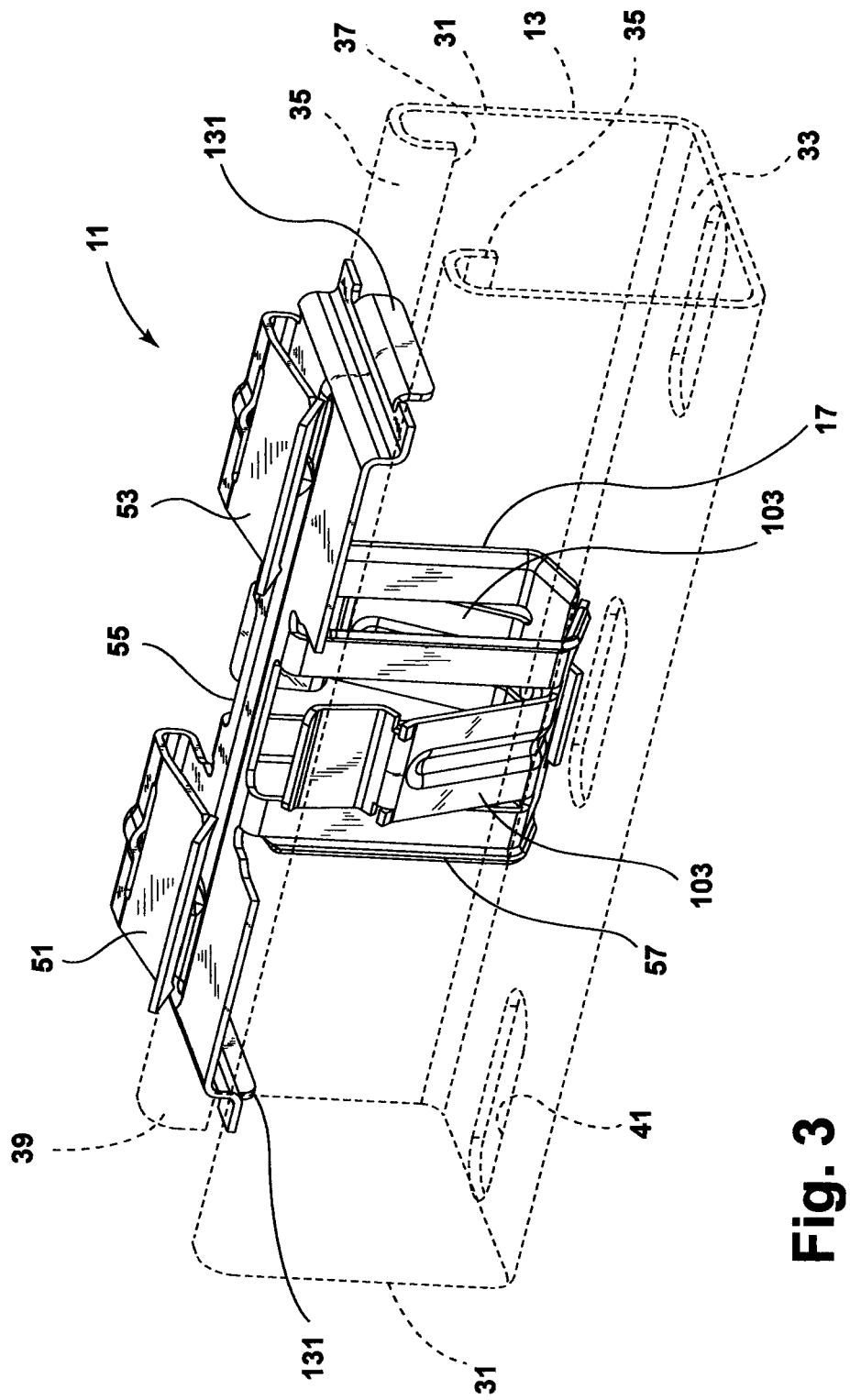
FIG. 3 is a front perspective view showing the apparatus.
Figure 4:
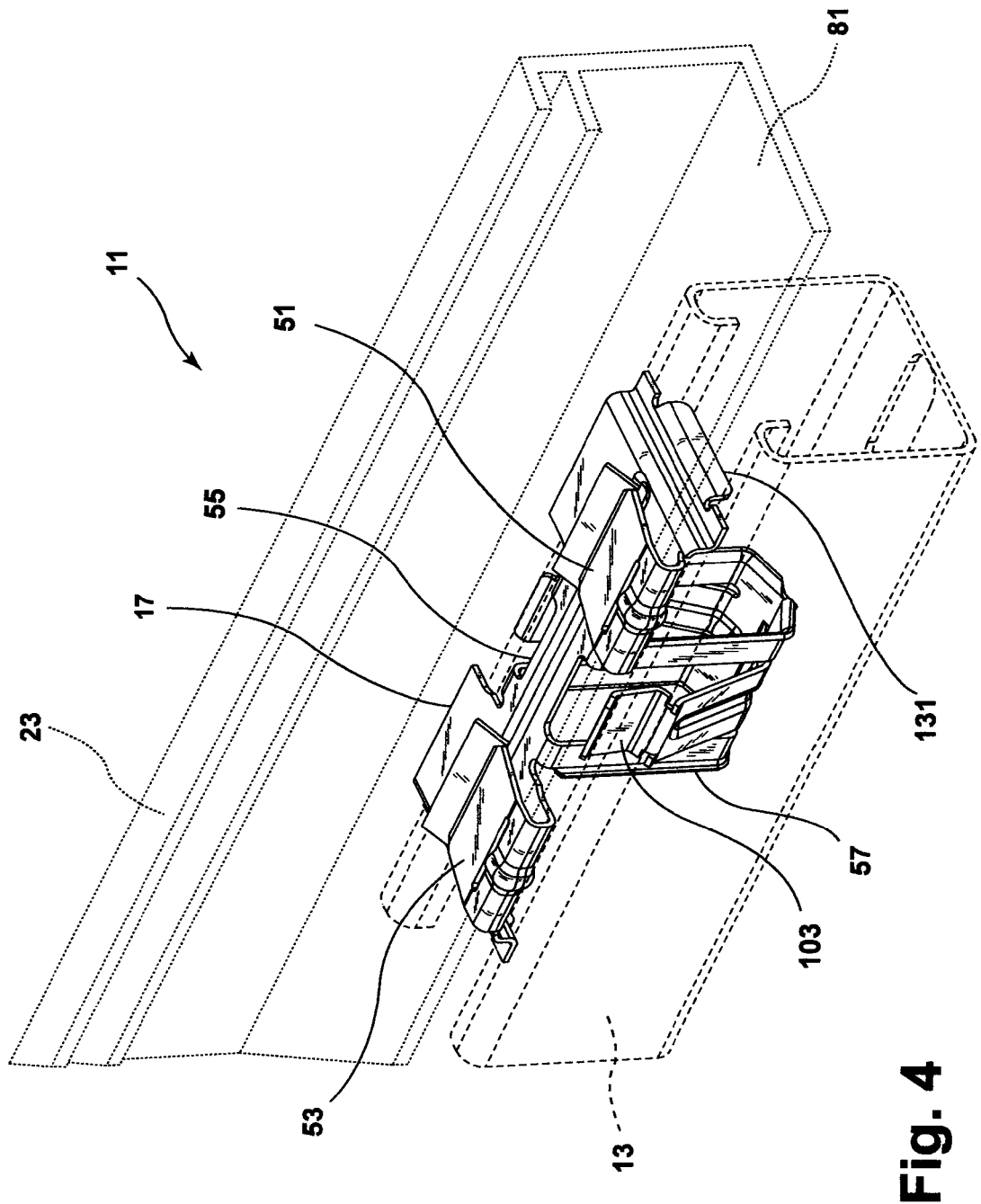
FIG. 4 is a back perspective view, taken somewhat opposite that of FIG. 3, showing the apparatus.

Referring to FIGS. 1-4, a solar panel assembly attachment apparatus 11 includes elongated and rigid struts 13, solar panel modules or assemblies 15, and grounding clips 17. Struts 13 are either mounted to vertical legs 19 attached to land, or are bolted onto a roof clamp or other structure on the top or side of a building. Each solar panel assembly 15 includes a glass photovoltaic panel 21 and a metallic frame 23.

Strut 13 has a uniform generally U-cross-sectional shape defined by upstanding side walls 31 joined by a bottom wall 33. A reverse-turned wall 35 extends from a top end of each side wall 31 and terminates in a downwardly directed edge 37. An elongated slot or channel 39 is defined between walls 35. Optional mounting holes 41 are provided in bottom wall 33 to allow for bolt or other building attachment. Strut 13 is preferably stamped or rolled from aluminum or steel.

Figure 5:
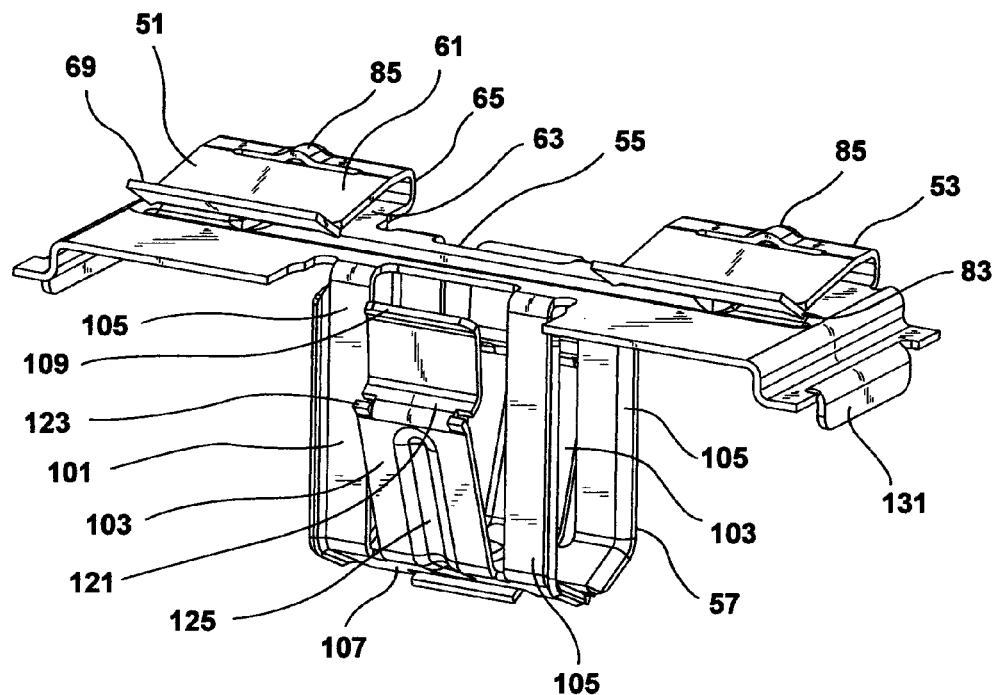
FIG. 5 is a front perspective view showing a clip of the apparatus.
Figure 6:
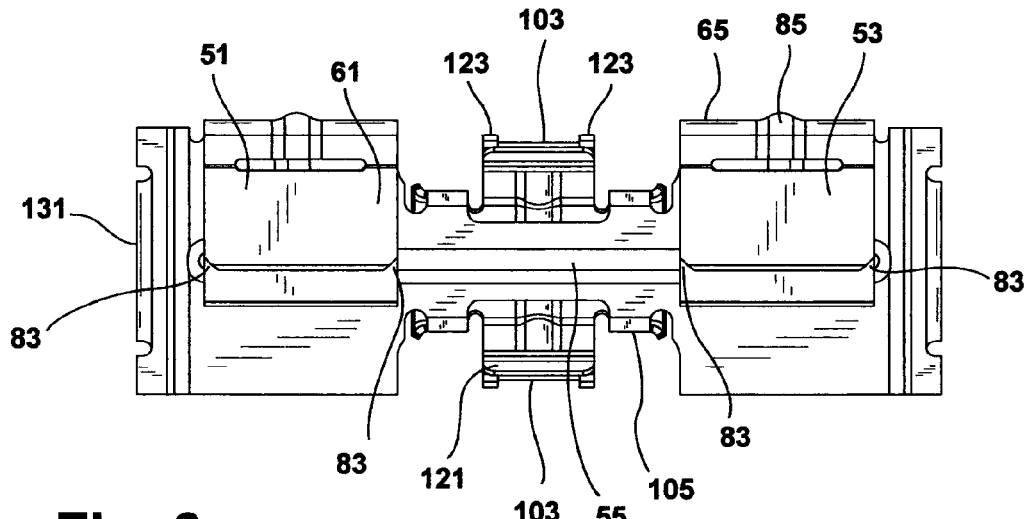
FIG. 6 is a top elevational view showing the clip of the apparatus.
Figure 7:
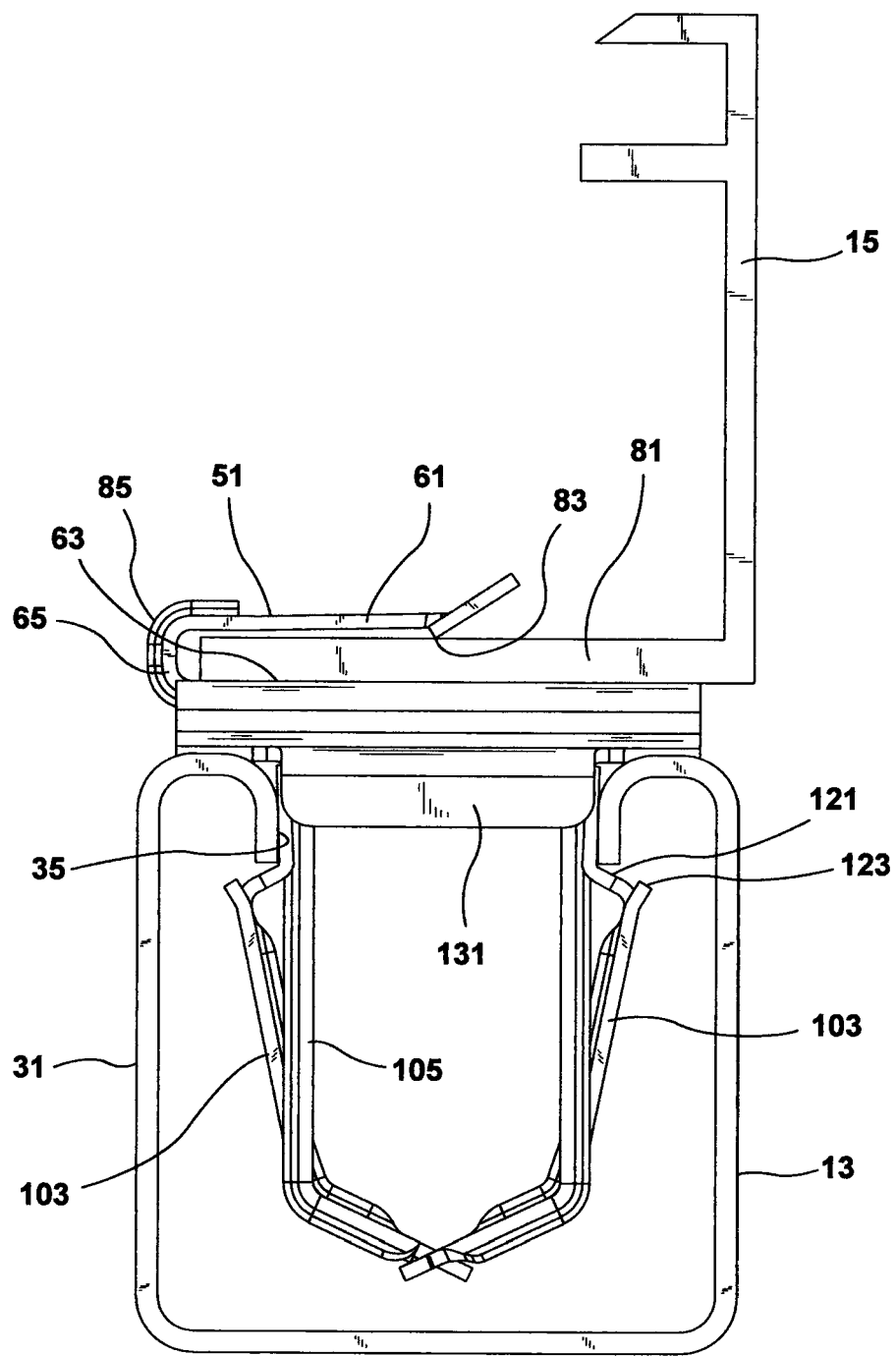
FIG. 7 is an end elevational view showing the apparatus.

Referring now to FIGS. 3-7, grounding clip 17 includes a pair of spaced apart clamps 51 and 53, an upper bridge 55 and a mounting section 57. Each clamp 51 and 53 has a generally C-shape defined between an upper wall 61, a lower wall 63 and a back wall 65, thereby creating an openly accessible receptacle 67 therebetween. Furthermore, a lead-in wall 69 upwardly and outwardly angles away from upper wall 61 to ease insertion of a flat lateral flange 81 of frame 15 therein during assembly. A pair of pointed barbs 83 internally project from each upper section of clamps 51 and 53. Each barb 83 cuts into and gouges the adjacent surface of flange 81 to scrape off the anodized coating on the aluminum frame 15 thereat. This provides multiple satisfactory electrical grounding paths between the base material of the frame and the clip. This can be achieved by the simple linear insertion of the clamps of the clip onto the flange of the frame without the need for rotation or a threaded attachment. Furthermore, a stiffening bead 85 is centrally provided on each upper wall 61 and back wall 65 to control the desired flexure of clamps 51 and 53.

Mounting section 57 includes a frame 101 and flexible wings 103. Frame 101 includes at least two, and more preferably four, members 105, the majority of which is longitudinally elongated generally perpendicular to a plane connecting bottom walls 63 of the clamps. Each wing 103 is laterally located generally between a pair of members 105 and is flexibly attached at an inwardly tapered distal end 107 of frame 101. A free-end 109 of each wing 103 is located closest to bridge 55. Furthermore, an offset step 121 is located along a longitudinal length of each wing 103 located closer to free end 109 than distal end 107. Catches 123 diagonally project from lateral edges of step 121 of each wing to aid in securing each edge 37 of reverse-turned walls 35 to steps 121 of the clip when fully installed.

A longitudinally elongated stiffening bead 125 is also provided along a lower diagonally angled segment of each wing 103. Moreover, tapered ends 107 of mounting section 101 abut against each other in a offset crossing manner so as to deter buckling or collapsing of the mounting section during installation or removal of the clip from the strut. Each end of clip 17 includes a downwardly stepped locating tab 131. This tab fits within channel 39 of strut 13 to deter undesired rotation of clip 17 relative to the strut when installed.

It is also noteworthy that the spaced apart and multiple clamps 51 and 53 of grounding clip 17 provide a longer and more secure attachment geometry to frame 15 while also providing four redundant electrical grounding paths. In other words, the clamp spacing relative to the wings deters inadvertent knocking off of the clip from the frame during strut attachment. In one construction, clip 17 electrically grounds frame 15 to strut 13 or, in another construction, may alternately have a hole for receiving a screwed-on eyelet or other separate wire along bridge 55 to thereby ground frame 15 to a separately wired circuit.

When fully installed, the solar panel hides a majority of the clip. This feature advantageously deters theft of the solar panel by making it less clear to a casual observer that compression together of the wings will allow detachment of the clip from the strut. Clip 17 is preferably stamped from a Magni coated spring steel, but alternately may be made from stainless steel.

While various features of the present solar panel assembly attachment apparatus have been disclosed herein, other variations may be employed. For example, a greater quantity of barbs or pointy projections may be provided on either the upper and/or lower walls of each clamp of the clip. Furthermore, a greater quantity of frame-engaging clamps can also be located on the clip although some benefits may not be achieved. Similarly, one or more wings (for example, four) can be employed for the clip although various advantages may not be realized. Alternately, the solar panel frame and/or strut can have differing shapes, flanges and slots for contacting with the present clip, for example, a flat sheet or tubular member with a rectangular hole therein, although certain advantages may not be obtained.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. Moreover, when the terms "top," "bottom," "side," "upper," "lower", "end," "above," "below," or the like are used, it is not intended to limit the orientation of the part since it is envisioned that the present apparatus can be inverted or positioned in many different ways. Similarly, the terms "first," "second" and the like should not limit the quantity of parts since these designations are merely intended as identifiers. Such variations are not to be regarded as a departure from the present disclosure, and all such modifications are intended to be included within the scope of the present disclosure.

The invention claimed is:

1. A solar panel assembly attachment apparatus comprising an electrically conductive and single piece grounding clip further comprising:
   at least one substantially C-shaped clamp including an upper wall;
   a lead-in wall upwardly and outwardly angling away from the upper wall;
   multiple barbs continuing from the lead-in wall and internally projecting from the upper wall; and
   a mounting section including flexible wings;
   the at least one clamp being adapted to linearly slide onto and sandwich a flange of a solar panel assembly frame therein;
   the barbs of the clip being adapted to electrically connect and provide a ground to the frame; and
   the mounting section being adapted to linearly enter an opening in a strut such that the wings are adapted to snap into engagement with the strut.

2. The apparatus of claim 1, wherein the clip further comprises a second substantially C-shaped clamp including at least one barb which is adapted to engage and ground the flange of the frame.

3. The apparatus of claim 2, wherein the clamps are laterally spaced apart with the wings being centrally located therebetween to define a substantially T-shape when viewed from its front elevation, with open mouths of the clamps facing the viewer.

4. The apparatus of claim 1, wherein the barbs include at least four spaced apart barbs which gouge into at least one coated surface of the flange of the frame when installed.

5. The apparatus of claim 1, wherein the wings flex about their proximal ends which are opposite the clamp, the wings are at least twice as long between their ends as compared to their lateral widths, each wing includes a step across its width that is located closer to its free end than its hinged end, and a receptacle of the clamp is openly accessible by the frame in substantially the same direction as a direction of flexure of the wings, an upstanding backwall defining a portion of the receptacle being substantially parallel to the steps.

6. The apparatus of claim 1, further comprising a glass solar panel mounted to the frame and hiding a majority of the clip when completely attached to the strut, the strut having a substantially U-shaped end view with the internal surfaces being reverse-turned walls, the wings removably abutting against edges of the reverse-turned walls, and the clamp being entirely laterally offset from above the entire mounting section.

7. A solar panel assembly attachment apparatus comprising:
   an elongated and rigid strut including a pair of opposed internal surfaces defining a slot therebetween;
   a solar panel frame including a lateral flange; and
   a clip further comprising a substantially C-shaped clamp coupled to a mounting section including flexible wings, the clamp including a receptacle defined between spaced apart upper and lower clamping walls, a lead-in wall upwardly and outwardly angling from the upper wall, and at least one barb continuing from the lead-in wall and projecting into the receptacle;
   the flange of the frame being linearly received into the receptacle of the clamp so the at least one barb engages the frame;
   the mounting section being linearly inserted into the slot of the strut so the wings snap into engagement with the internal surfaces of the strut; and
   the at least one barb grounding the clip to the frame and the clip attaching the frame to the strut.

8. The apparatus of claim 7, further comprises a second substantially C-shaped clamp including at least one barb which engages and grounds the flange of the frame.

9. The apparatus of claim 8, wherein the clamps are laterally spaced apart with the wings being centrally located therebetween to define a substantially T-shape when viewed from its front elevation, the mounting section defining the central portion of the substantially T-shape.

10. The apparatus of claim 7, wherein the clip is a single metallic piece which directly contacts against opposite surfaces of the flange of the frame which is also metallic, and the clamp is laterally offset from above the wings.

11. The apparatus of claim 7, wherein the at least one barb includes at least four spaced apart barbs which cut into at least one coated surface of the flange of the frame when installed.

12. The apparatus of claim 7, wherein the wings flex about their ends which are opposite the clamp, the wings being at least twice as long between their ends as compared to their lateral widths, each wing includes a step across its width that is located closer to its free end than its proximal end, and the clip further comprises multiple locating and anti-rotation tabs each projecting in a strut-engaging direction outboard of opposite lateral ends of the clip.

13. The apparatus of claim 7, further comprising a glass solar panel mounted to the frame and hiding a majority of the clip when completely attached to the strut, the strut having a substantially U-shaped end view with the internal surfaces being reverse-turned walls, and the wings removably abutting against edges of the reverse-turned walls.

14. A solar panel assembly attachment apparatus comprising:
    (a) a solar panel frame;
    (b) a grounding fastener further comprising:
        (i) a first substantially C-shaped clasp;
        (ii) at least a second substantially C-shaped clasp, each of the clasps sandwiching a portion of the frame therein;
        (iii) at least one pointed projection extending from each of the clamps to provide electrical grounding contact with the portion of the frame;
        (iv) a member longitudinally extending in a substantially perpendicular direction to a plane laterally spanning between walls of the clasps; and
        (v) at least one snap-in wing being flexibly coupled adjacent a distal end of the member, and the clasps being entirely laterally outboard of the wing.

15. The apparatus of claim 14, further comprising a second snap-in wing being flexibly coupled adjacent the distal end of a second member of the fastener, each of the wings including a step located closer to its free end than to its proximal end.

16. The apparatus of claim 14, wherein the elongated member is bent in a tapered direction at its end opposite the clasps, and frame access-openings of the clasps are both oriented in substantially the same direction as a flexure direction of the wing.

17. The apparatus of claim 14, wherein the clasps are laterally spaced apart with the wing being centrally located therebetween to define a substantially T-shape when viewed from its front elevation, and the wing defines at least part of the central portion of the substantially T-shape.

18. The apparatus of claim 14, wherein the fastener is a single metallic piece which directly contacts against opposite surfaces of the portion of the frame which is also metallic.

19. The apparatus of claim 14, further comprising a glass solar panel mounted to the frame and hiding a majority of the fastener when completely attached to an elongated strut, the strut having a substantially U-shaped end view with the internal surfaces being reverse-turned walls, and the wings removably abutting against edges of the reverse-turned walls.

20. A solar panel assembly attachment apparatus comprising an electrically conductive grounding fastener further comprising:
    (a) a first clamp;
    (b) at least a second clamp laterally spaced apart from the first clamp;
    (c) at least one pointed projection extending from each of the clamps to provide grounding contact;
    (d) a bridge spanning between the clamps;
    (e) elongated members longitudinally extending from the bridge;
    (f) a first snap-in wing flexibly coupled between a pair of the members;
    (g) a second snap-in wing flexibly coupled between another pair of the members, each of the wings including a step located closer to its free end than to its flexibly coupled end;
    (h) a bent tapered segment located adjacent a distal end of the members; and
    (i) anti-rotational tabs located adjacent and laterally outboard of the clamps.

21. The apparatus of claim 20, further comprising an elongated strut having a slot and a solar panel frame having a flange, the clamps linearly sliding onto the frame such that the pointed projections provide a grounding path between the flange of the frame and the fastener, the wings of the fastener snapping into the slot of the strut in a removable manner, the direction of flexure of the wings being substantially the same as a direction of linear sliding of the clamps onto the frame, and the fastener attaching the frame to the strut in an unthreaded manner.

22. A method of grounding a solar panel frame and attaching the frame to a rigid strut, the method comprising:
    (a) linearly pushing a single piece and entirely metallic clip onto a portion of the solar panel frame in a first direction;
    (b) compressing more than two spaced apart, pointed projections of the clip into the portion of the frame; and
    (c) flexibly snapping wings of the clip into the rigid strut;
    wherein the clip grounds the frame and attaches the frame to the strut in primarily linear unthreaded installation motions, and
    wherein the rigid strut is elongated in a second direction perpendicular to the first direction; and
    (d) contacting anti-rotational tabs located adjacent and laterally outboard of the clip, against the strut.

23. The method of claim 22, further comprising pre-assembling the clip to the frame off-site in a factory.

24. The method of claim 22, further comprising pre-assembling the clip to the frame prior to attachment of the clip or frame to the strut.

25. The method of claim 22, further comprising cutting a coating on the frame with the pointed projections, and using the clip to electrically ground the frame to the strut.

26. The method of claim 22, further comprising engaging the portion of the frame with at least two substantially C-shaped and spaced apart clamps of the clip, the pointed projections internally extending within the clamps, and the wings being centrally located substantially between the clamps.

* * * * *